Jan. 13, 1953     C. H. MAYER     2,625,170
VALVE CORE FOR PNEUMATIC TIRE VALVE STEMS
Filed Jan. 7, 1950

INVENTOR.
CHARLES H. MAYER
BY
*Kenyon & Kenyon*
ATTORNEYS

Patented Jan. 13, 1953

2,625,170

UNITED STATES PATENT OFFICE 2,625,170

VALVE CORE FOR PNEUMATIC TIRE VALVE STEMS

Charles H. Mayer, Stratford, Conn., assignor to Bridgeport Brass Company, Bridgeport, Conn., a corporation of Connecticut Application January 7, 1950, Serial No. 137,327

1 Claim. (Cl. 137—223)

This invention relates to a valve core or "insides" for a pneumatic tire valve stem.

One of the inventor's objectives in developing this core was to improve on the type disclosed by Patent 2,142,044 which issued December 27, 1938 to L. C. Broecker.

This prior art type uses a gasket made of flexible rubber compound and which surrounds the upper portion of the barrel of the device. Heretofore it has used a cup on the bottom end portion of the center or valve pin. This cup has been filled with flexible rubber compound to form an elastic valve surface for sealing against the bottom edge of the lip which is part of the bottom portion of the barrel.

The barrel gasket is applied by molding the rubber compound about the barrel. A separate molding operation has been used to mold the rubber compound in the cup. Since the valve pin projected through the material in the cup, there has been the possibility of air leakage up around the pin between it and the rubber compound in the cup.

With the above in mind, the present inventor sought to improve the construction of this type of core, whereby to permit all the rubber compound, or any equivalent to it, to be applied by a single molding step. He further sought to provide a design positively eliminating all chance for the above mentioned leakage to occur. These objects are successfully attained by the present invention.

A specific example of a valve core, incorporating the principles of this invention, is described hereinbelow and illustrated by the accompanying drawings. This is for the purpose of explaining the principles of the invention and its mode of operation. Once those skilled in the art understand these principles and operation, they may use them in other forms than are herein specifically disclosed, and they may even apply them outside of the valve core field.

Figure 1:
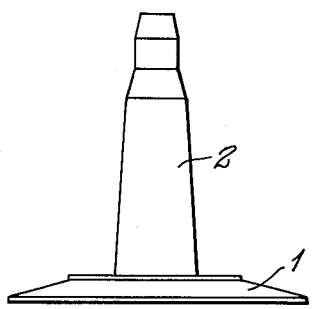
Figure 2:
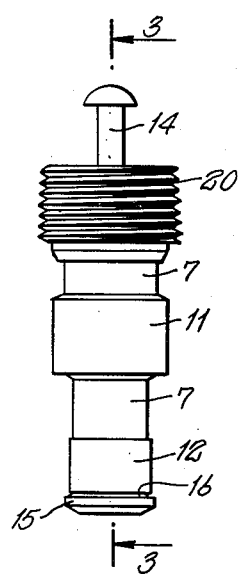

In these accompanying drawings:

Fig. 1 is a side view of a flexible rubber valve stem in which the new valve core is installed; Fig. 2 is a side view of the valve core itself, on a larger scale respecting Fig. 1, as it appears when removed from the valve stem; and Fig. 3, in vertical section, shows the valve core of Fig. 2 as it appears when installed in the valve stem.

The illustrated valve stem is of the type used for the inner tube of the pneumatic tire of a passenger automobile. It includes an integrally united base 1 and stem 2 both made from flexible rubber compound.

Figure 3:
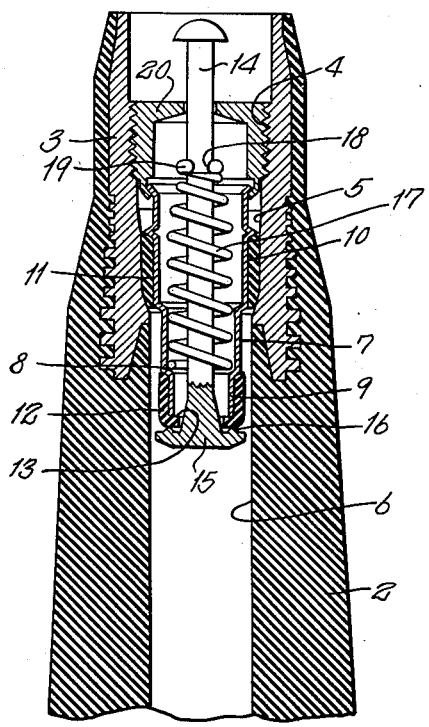

The general contour of the stem is shown by Fig. 1, while Fig. 3 shows that inside of the stem, at its top portion, there is a short tubular metal insert 3. This insert has internal threads 4 in which the valve core is screwed, and below these threads, a chamber 5 wherein the valve core gasket seats and seals air-tightly. The rubber compound stem 2 is mainly free from the metal insert 3, and it has a bore 6 forming the air passage connecting with the inner tube.

In this country the various valve stem manufacturers have standardized the inside contour of the zone wherein the valve core is located. The dimensions and arrangements, throughout this inside portion of the stem, are the same in all instances within relatively narrow dimensional tolerances. This standardization permits standardization of the valve cores produced by the various manufacturers. Therefore, the public can use any valve core with any valve stem regardless of whether both the stem and core are produced by the same manufacturer.

The illustrated valve core includes a tubular barrel 7 having its bottom end portion with an inwardly extending annular shoulder 8 and with an annular lip 9 depending from the inner portion of this shoulder. The barrel also includes an annular gasket-mounting 10 spaced well above the shoulder 8. All portions of the barrel are integral, the barrel being formed as a deep-drawn sheet metal part.

A body of elastic material, exemplified by rubber compound, is mounted about the mounting 10 in the form of a gasket 11 entirely spaced above the shoulder 8 and surrounding the mounting 10. This gasket has an outside diameter air-tightly sealing with the inside portion 5 of the valve stem insert or the corresponding portion of any standard valve stem.

As so far described the illustrated device is substantially like the prior art type of the previously mentioned patent.

At this point the new device diverges from the prior art by having a separate piece of elastic material, again exemplified by rubber compound, mounted about the lip 9 beneath the shoulder 8. This material is in the form of a sleeve 12, surrounding the lip, with an outside diameter materially and appreciably smaller than the inside diameter of the mutually registering portion of the inside of the bore 6 or the corresponding portion of any standard valve stem. This material is further formed to integrally provide this sleeve 12 with an inwardly extending annular shoulder or flange 13 beneath and contacting the bottom edge of the lip 9.

A valve pin or stem 14 extends longitudinally down through the barrel 7 to a location below the bottom of the lip 9. In the prior art device, the part comparable to this pin mounted, on its bottom end, the cup filled with rubber compound which contacted the bottom of the lip 9 which was exposed.

The new device again diverges in that the bottom end of the pin 14 has a valve head 15 integrally joined with it. This valve head has an integral, upstanding, closure ridge 16 which is annular and registers with the seat now formed by the bottom of the shoulder or flange 13 projecting inwardly from the bottom of the sleeve 12. The pin 14, the valve 15 and the ridge 16 may all be formed integrally by an upsetting operation performed on a suitable piece of wire.

The illustrated core also has a compression coil spring 17 encircling the pin 14. The lower end of this spring has a diameter causing it to seat on the inside of the barrel-shoulder 8, and the upper end of this coil spring is fastened to the pin. Fastening is effected by terminating the top of the coil spring with a convolution sufficiently small to hug the pin 14, the latter being provided with a groove 18 into which a springy split-ring 19 is snapped. The fastening position is located to cause some compression of the spring 17. In this fashion the spring continuously biases the pin 14 to its valve-closing position.

A screw plug 20 encircles the upper end portion of the pin 14, and it has its outside threaded to fit the thread of the insert or any standard valve stem. This screw plug 20 is constructed to permit the passage of air longitudinally therethrough in the customary manner. It may have the conventional form wherein this plug comprises only a central segment of a cylinder, whereby it has a flat nature.

As described, the device provides a self-contained unit attaining the inventor's objectives. All of the non-metallic parts, 11 and 12—13, may be simultaneously applied by a single molding step. This provides the barrel with its usual gasket and, simultaneously, the necessary, elastically yielding, valve seating surface. This eliminates the need for separate operations required by the prior art construction. Since the pin 14 and the valve 15 and the ridge 16 are all integrally made, there is positively no chance for any air leakage to occur through the junction of the pin and the valve head. Obviously no leakage can occur beneath the ridge 16. These advantages are gained without sacrificing any of the advantages of the claimed construction of the previously mentioned patent.

Since the outside of the non-metallic sleeve 12 is spaced from the inside of the registering portion of the bore 6, the disclosed valve core seats itself easily in the intended manner, during installation. Furthermore, when the valve core is used with a rubber valve stem there is no intercontact between the rubber compound of the sleeve 12 and the rubber compound defining the bore 6. This eliminates any chance for these parts adhering when operating under service conditions. There is no danger of the core sticking so that it cannot be removed.

The space between the outside of the sleeve 12 and the inside of the bore 6 has the further advantage of freeing the elastic valve seat from external confining stress. When the ridge 16 seats against the shoulder 13 the elastic material is free to deflect laterally. This permits the material to function as an elastic medium. Rubber compound or the like is not ordinarily elastically compressible. It can only be elastically deformed when there is room for the material to flow away from the stressed locality. With the periphery of the elastic valve seat of the present invention free from confinement, the elastic property of the valve seat is fully realized.

I claim:

A valve core for a pneumatic tire valve stem, said core including, in combination, a tubular barrel having its bottom end portion formed with an inwardly extending annular shoulder with an annular lip depending from the inner portion of this shoulder, and having, spaced above this shoulder, an annular gasket mounting; a body of elastic material molded about said mounting in the form of a gasket entirely spaced above said shoulder and having an outside surface of sufficient diameter to air-tightly seal with the inside of a valve stem; a separate body of elastic material molded about said lip beneath said shoulder in the form of a sleeve surrounding said lip with an outside diameter smaller than the inside diameter of the registering portion of the inside of a valve stem, and with this sleeve having an inwardly extending annular shoulder beneath and contacting the bottom edge of this lip; an integral valve and valve pin with the latter extending longitudinally through and above said barrel and with this valve in the form of an outwardly extending, annular shoulder, positioned on the bottom of this pin, and having an upstanding annular ridge with a diameter larger than the inside diameter and smaller than the outside diameter of said shoulder of said sleeve, so that this shoulder functions with this ridge to form a seal; a coil compression spring encircling said pin with its lower end engaging the inside top of said shoulder of said barrel and with its upper end fastened to this pin to bias the latter to valve-closing position; and a screw plug encircling the upper end portion of said pin above said barrel with its outside threaded to fit threads on the inside of said stem and which is constructed to permit the passage of air therethrough.

CHARLES H. MAYER.

REFERENCES CITED

The following references are of record in the file of this patent:

UNITED STATES PATENTS

| Number | Name | Date |
|---|---|---|
| 542,472 | Goss | July 9, 1895 |
| 724,128 | Schrader | Mar. 31, 1903 |
| 1,170,412 | Campbell | Feb. 1, 1916 |
| 2,188,713 | Gora | Jan. 30, 1940 |
| 2,279,513 | Hage | Apr. 14, 1942 |

FOREIGN PATENTS

| Number | Country | Date |
|---|---|---|
| 331,750 | France | of 1903 |